Patented Jan. 13, 1942

2,269,600

UNITED STATES PATENT OFFICE 2,269,600

PRODUCTION OF CARBON CHLORIDE COMPOUNDS OF THE FORMULA $C_4Cl_6$

Martin Mugdan, Munich, Bavaria, and Josef Wimmer, Burghausen, upper Bavaria, Germany, assignors to Consortium fur Elektrochemische Industrie, G. m. b. H., Munich, Bavaria, Germany, a corporation of Germany No Drawing. Application March 31, 1938, Serial No. 199,290. In Germany April 17, 1937

13 Claims. (Cl. 260—655)

This invention relates to a novel carbon-chloride compound of the formula $C_4Cl_6$ and to a process for producing same.

We have found that hexachlorbutene ($C_4H_2Cl_6$), which is generated by heating trichlorethylene under pressure as disclosed in our application Serial No. 117,903, filed December 28, 1936, quickly splits off a mol of HCl under treatment with certain metal chlorides at an elevated temperature and goes over into the compound $C_4HCl_5$, which is largely pentachlorbutadien.

This last mentioned compound can be transformed into heptachlorbutene ($C_4HCl_7$) by treatment with chlorine in the presence of chlorine carriers, preferably chloride of antimony. The heptachlorbutene has the property of splitting off another mol of HCl by further treatment with metal chlorides. Our new carbon-chloride compound of the formula $C_4Cl_6$ is generated during the process. These reactions involving the alternate splitting off of HCl and the addition of chlorine occur with almost quantitative yield.

We have found that it is not necessary to produce a pure intermediate body, since the chloride catalysts do not adversely affect one another. Chlorination may be effected quite readily after the HCl dissociation from hexachlorbutene in the presence of a chlorinating agent such as a small quantity of chloride of antimony, and thereafter HCl may be split off again at a somewhat higher temperature. Accordingly it is quite possible to perform the operation of the HCl dissociations and the chlorine addition simultaneously by treating hexachlorbutene at an elevated temperature and with simultaneous use of both catalysts with chlorine, whereby the carbon-chloride end product is generated without an intermediate operation with HCl dissociation. It is, however, preferable to allow the process to take place in successive steps so as to obtain the hydrochloric acid entirely free from chlorine and so as not to impair the chlorine addition through the HCl dissociation. Moreover, it is also possible to chlorinate the hexachlorbutene in the first place, whereby octachlorbutane ($C_4H_2Cl_8$) is produced, and to transform this by treatment with the HCl-dissociation catalyst into the $C_4Cl_6$, whereby two molecules of HCl are split off.

For the HCl dissociation, chloride compounds of iron, cobalt and manganese are particularly suitable.

Example 1

1 mol (262 g.) hexachlorbutene was heated with 0.5 g. ferric chloride to a temperature of 70–140° C. After about two hours 1 mol HCl was split off. Thereupon 0.3 g. of antimony chloride was added, and, while stirring, chlorine was added at about 70° C. During the heat development chlorine in the amount of 71 g. was quickly taken up. After the termination of the chlorine take-up, the temperature was raised to 140° to 200° C. A further mol of HCl was split off during this step of the process. Finally the product, $C_4Cl_6$, was freed from the catalysts with diluted hydrochloric acid and water, and distilled. It distilled over under 712 mm. at 211°–212° C.

Example 2

1 mol hexachlorbutene was mixed with 0.3 g. chloride of antimony, and treated with chlorine at 80–90° C. while being stirred. 71 g. chlorine were taken up in three hours. The octachlorbutane which was produced was then mixed with 0.5 g. ferric chloride, and heated to 120–200° C. In about two hours 2 mols HCl were split off. The carbon-chloride compound thus obtained was found to be identical with that obtained according to Example 1.

Example 3

1 mol hexachlorbutene was mixed with 0.5 g. ferric chloride and 0.7 g. antimony chloride, and treated with chlorine while being stirred at 70° C. The chlorine was absorbed during the simultaneous splitting off of HCl. In order to complete the HCl dissociation the temperature was finally raised to 200° C. The product consisted substantially of the compound $C_4Cl_6$.

This new carbon-chloride of the formula $C_4Cl_6$ boils without disintegration at 211° C. (710 mm.), 215° C. (760 mm.); melting point —21° C. This $C_4Cl_6$ is not changed by heating to temperatures far above the boiling point under pressure, and it is very resistant to metals, to concentrated mineral acids and to aqueous alkali solutions even at elevated temperatures. $C_4Cl_6$ may be used as a non-inflammable solvent, as a substitute for or addition to mineral oils in all situations in which mineral oils are used except for combustion purposes, as heat transfer means and the like, as well as for chemical ulterior treatments.

The invention claimed is:

1. The process for producing a carbon chloride of the formula $C_4Cl_6$ from hexachlorbutene which comprises adding two atoms of chlorine by treatment with chlorine in the presence of a chlorination catalyst and removing two molecules of hydrogen chloride by treatment with a dehydrochlorination catalyst, the individual chlorination and dehydrochlorination steps being carried out in any order.

2. The process for producing a carbon chloride of the formula $C_4Cl_6$ from hexachlorbutene which comprises adding two atoms of chlorine by treatment with chlorine in the presence of a chlorination catalyst and removing two molecules of hydrogen chloride by treatment with a dehydrochlorination catalyst selected from the group consisting of the chloride compounds of iron, cobalt and manganese, the individual chlorination and dehydrochlorination steps being carried out in any order.

3. The process for producing a carbon chloride of the formula $C_4Cl_6$ from hexachlorbutene which comprises adding two atoms of chlorine by treatment with chlorine in the presence of antimony chloride as a chlorination catalyst and removing two molecules of hydrogen chloride by treatment with a dehydrochlorination catalyst, the individual chlorination and dehydrochlorination steps being carried out in any order.

4. The process for producing a carbon chloride of the formula $C_4Cl_6$ from hexachlorbutene which comprises adding two atoms of chlorine by treatment with chlorine in the presence of antimony chloride as a chlorination catalyst and removing two molecules of hydrogen chloride by treatment with a dehydrochlorination catalyst selected from the group consisting of the chloride compounds of iron, cobalt and manganese, the individual chlorination and dehydrochlorination steps being carried out in any order.

5. The process of producing a carbon compound of the formula $C_4Cl_6$ which comprises heating hexachlorbutene at a temperature between 70° C. and 140° C. in the presence of a dehydrochlorination catalyst until one molecule of hydrogen chloride is split off, treating the resulting pentachlorbutadiene with chlorine in the presence of a chlorination catalyst at a temperature of about 70° C., and heating the resulting heptachlorbutene to a temperature between 140° C and 200° C. in the presence of a dehydrochlorination catalyst until another molecule of hydrogen chloride is split off.

6. The process of producing a carbon compound of the formula $C_4Cl_6$ which comprises heating hexachlorbutene at a temperature between 70° C. and 140° C. in the presence of a dehydrochlorination catalyst selected from the group consisting of the chloride compounds of iron, cobalt and manganese until one molecule of hydrogen chloride is split off, treating the resulting pentachlorbutadiene with chlorine in the presence of a chlorination catalyst at a temperature of about 70° C., and heating the resulting heptachlorbutene to a temperature between 140° C. and 200° C. in the presence of a dehydrochlorination catalyst selected from the group consisting of the chloride compounds of iron, cobalt and manganese until another molecule of hydrogen chloride is split off.

7. The process of producing a carbon compound of the formula $C_4Cl_6$ which comprises heating hexachlorbutene at a temperature between 70° C. and 140° C. in the presence of a dehydrochlorination catalyst selected from the group consisting of the chloride compounds of iron, cobalt and manganese until one molecule of hydrogen chloride is split off, treating the resulting pentachlorbutadiene with chlorine in the presence of antimony chloride as a chlorination catalyst at a temperature of about 70° C., and heating the resulting heptachlorbutene to a temperature between 140° C. and 200° C. in the presence of a dehydrochlorination catalyst selected from the group consisting of the chloride compounds of iron, cobalt and manganese until another molecule of hydrogen chloride is split off.

8. The process of producing a carbon compound of the formula $C_4Cl_6$ which comprises heating hexachlorbutene at a temperature between 70° C. and 140° C. in the presence of a dehydrochlorination catalyst until one molecule of hydrogen chloride is split off, adding to the resulting mixture of the dehydrochlorination catalyst and pentachlorbutadiene antimony chloride as a chlorination catalyst, adding chlorine to such mixture while heating the mixture to about 70° C. until two atoms of chlorine are taken up, and then raising the temperature of the mixture still containing such dehydrochlorination catalyst to a temperature between 140° C. and 200° C. until another molecule of hydrogen chloride is split off.

9. A process for producing a carbon compound of the formula $C_4Cl_6$ which comprises treating hexachlorbutene with chlorine at a temperature between 80° C. and 90° C. in the presence of a chlorination catalyst until two atoms of chlorine are taken up, and heating the resulting octachlorbutane to a temperature between 140° C. and 200° C. in the presence of a dehydrochlorination catalyst until two molecules of hydrogen chloride are split off.

10. A process for producing a carbon compound of the formula $C_4Cl_6$ which comprises treating hexachlorbutene with chlorine at a temperature between 80° C. and 90° C. in the presence of antimony chloride as a chlorination catalyst until two atoms of chlorine are taken up, and heating the resulting octachlorbutane to a temperature between 140° C. and 200° C. in the presence of a dehydrochlorination catalyst selected from the group consisting of the chloride compounds of iron, cobalt and manganese until two molecules of hydrogen chloride are split off.

11. A process for producing a carbon compound of the formula $C_4Cl_6$ which comprises treating hexachlorbutene with chlorine at a temperature of about 70° C. in the presence of a catalytic material containing ferric chloride as the essential constituent until two atoms of chlorine are taken up and one molecule of hydrogen chloride is split off, and heating the resulting heptachlorbutene to a temperature of about 200° C. in the presence of said catalyst until another molecule of hydrogen chloride is split off.

12. A process for producing a carbon compound of the formula $C_4Cl_6$ which comprises treating hexachlorbutene with chlorine at a temperature of about 70° C. in the presence of a catalytic material containing as an essential constituent at least one member of the group of metal chlorides consisting of ferric chloride and antimony chloride until two atoms of chlorine are taken up and one molecule of hydrogen chloride is split off, and heating the resulting heptachlorbutene to a temperature of about 200° C. in the presence of ferric chloride as a dehydrochlorination catalyst until another molecule of hydrogen chloride is split off.

13. As a new composition of matter, a carbon-chloride compound of the formula $C_4Cl_6$ having a boiling point of 215° C. (760 mm.) and a melting point of about −21° C., said compound being stable at temperatures even above the boiling point.

MARTIN MUGDAN.
JOSEF WIMMER.